May 9, 1950 R. C. MOORE 2,507,317
METHOD AND APPARATUS FOR SYNCHRONIZING OSCILLATORS
Filed Sept. 23, 1944 3 Sheets-Sheet 1

INVENTOR.
Robert C. Moore
BY
Howson & Howson
Attys.

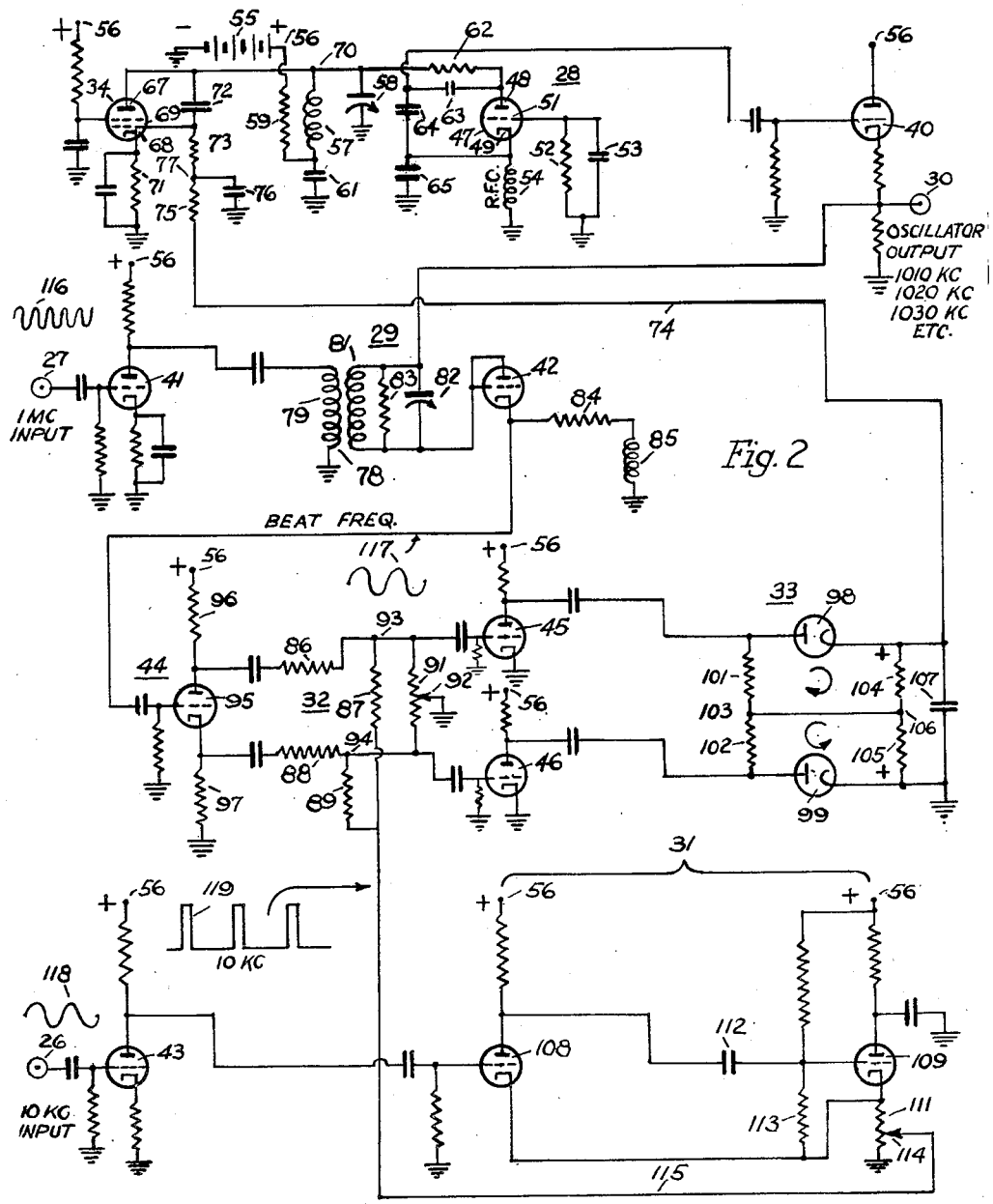

May 9, 1950  R. C. MOORE  2,507,317
METHOD AND APPARATUS FOR SYNCHRONIZING OSCILLATORS
Filed Sept. 23, 1944  3 Sheets-Sheet 3
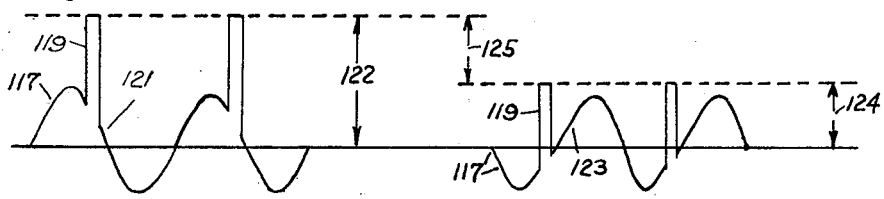
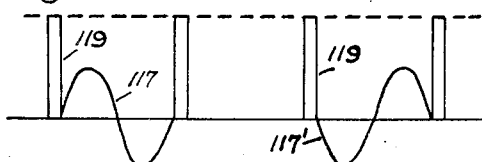
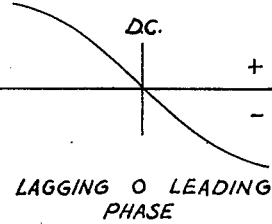
LAGGING 0 LEADING
PHASE
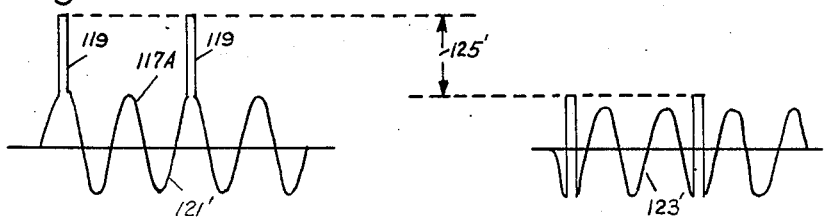
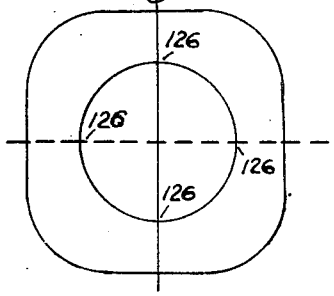
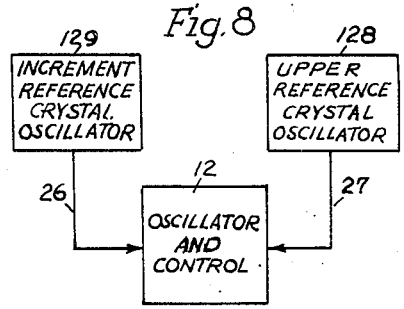
INVENTOR.
Robert C. Moore
BY
Howson & Howson
Attys.

Patented May 9, 1950

2,507,317

UNITED STATES PATENT OFFICE 2,507,317

METHOD AND APPARATUS FOR SYNCHRONIZING OSCILLATORS

Robert C. Moore, Philadelphia, Pa., assignor, by mesne assignments, to Philco Corporation, Philadelphia, Pa., a corporation of Pennsylvania Application September 23, 1944, Serial No. 555,528

9 Claims. (Cl. 250—36)

The present invention relates to electronic circuits and control apparatus. Among the objects of the invention is the provision of improved synchronizing systems and controlled frequency generators.

An object of the invention is to provide a system for synchronizing two oscillators at different, but related frequencies.

Another object is to provide a standard signal generator of high accuracy, which is adjustable in frequency, and which may be operated over a wide range of frequencies varied in small steps.

A further object of the invention is to provide improved methods for synchronizing oscillatory apparatus and for controlling frequency.

Further objects of the invention are to provide methods and apparatus for synchronizing a tunable oscillator with a crystal of different frequency.

Other and further objects, features and advantages will become apparent as the description proceeds.

In carrying out the invention in accordance with one embodiment thereof, a crystal oscillator serving as a reference frequency is provided, and signals from the crystal reference are mixed in a mixing device with signals from a local oscillator which is tunable and which is to be controlled. The mixing device is utilized to give an output of the difference or beat-frequency. The crystal signal is also divided down to a lower accurate frequency and formed into a pulse. The pulse signal and the beat signal are fed to a balanced discriminator circuit. In this manner, a direct current voltage is developed by the discriminator depending on the phase relationship between the beat-frequency signal and whichever multiple of the accurate pulse signal corresponds in frequency. The direct current voltage is applied to a reactance tube to keep the tunable local oscillator at such a frequency and phase that the system is kept in equilibrium. By this means the frequency and also the phase of the tunable oscillator are kept in strict relationship to the crystal reference.

A better understanding of the invention will be afforded by the following detailed description considered in conjunction with the accompanying drawings, and its scope will be set forth in the claims.

In the drawing Fig. 1 is a schematic block diagram of an embodiment of the invention.

Fig. 2 is a circuit diagram of a portion of the apparatus of Fig. 1.

Figs. 3, 4 and 5 are graphs explanatory of the principle of operation of a portion of the apparatus.

Fig. 6 is a graph illustrating the principle of operation with a different frequency-step adjustment from that represented by Figs. 3 and 4.

Fig. 7 is a diagram representing the screen of the monitor tube represented schematically in Fig. 1.

Fig. 8 is a schematic block diagram of an arrangement in which reference frequencies are employed having an odd ratio or having such values that a division corresponding to the ratio cannot conveniently be carried out electrically.

Figure 1:
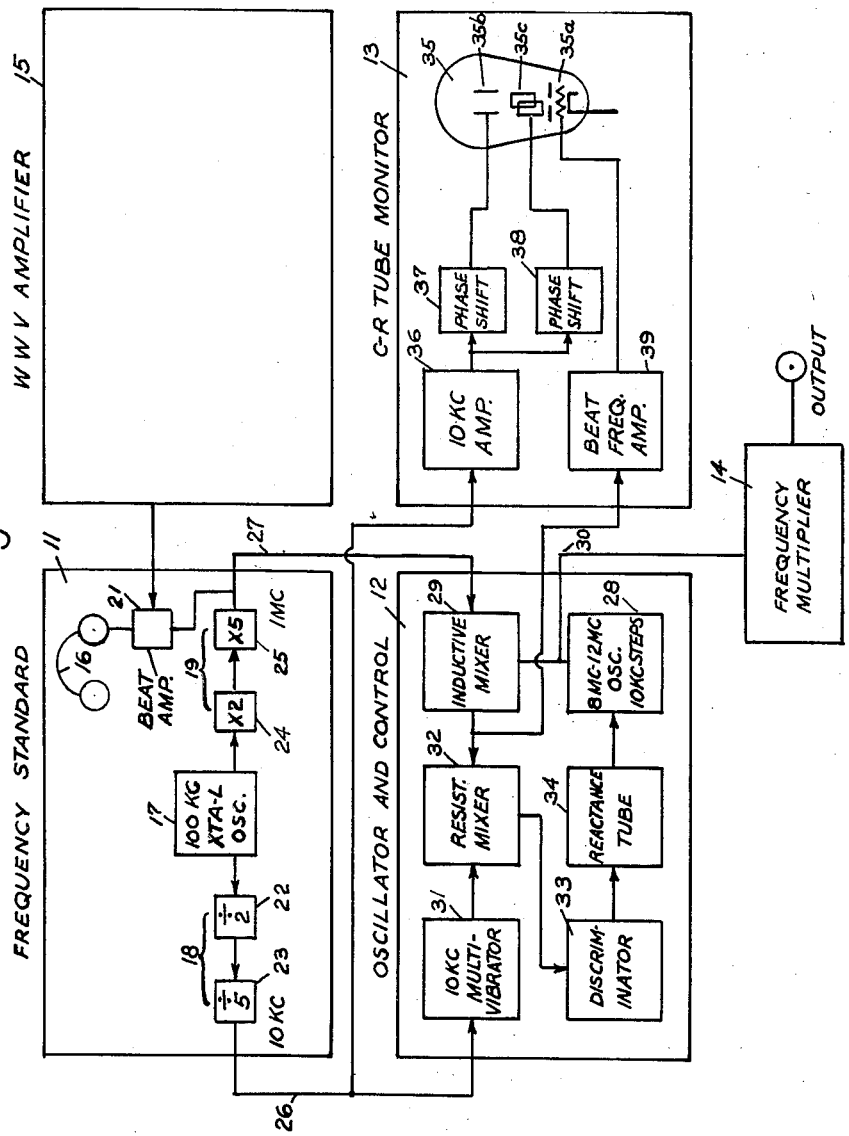

The arrangement illustrated in Fig. 1 comprises a frequency standard represented by a rectangle 11, an oscillator and control unit represented by a rectangle 12, and a cathode ray tube type of monitor represented by a rectangle 13. The frequency standard is preferably of a type which provides output at two different frequencies. If desired, a frequency multiplier 14 may be provided for enabling frequencies to be produced beyond the order of magnitudes readily provided by the operation of the control unit 12.

For enabling the frequency standard to be compared with an absolute standard such as the signal supplied by the United States Bureau of Standards, and transmitted from a radio station such as station WWV, an amplifier 15 may be provided for supplying signals from station WWV to the frequency standard.

The frequency standard 11 comprises a reference crystal oscillator 17, which for the sake of illustration is represented as a 100-kilocycle crystal oscillator, a pair of frequency changing devices 18 and 19, which in the specific case illustrated, are a frequency divider and a frequency multiplier respectively, and a beat-frequency detector and amplifier 21, supplying a detector such as head-phones 16 for revealing any discrepancy between the output of the frequency standard 11 and an absolute standard such as the signal from the WWV amplifier 15. The frequency changing devices 18 and 19 are provided in order that a single reference crystal 17 may be utilized for causing two different reference, control or standard frequencies to be produced, one of which is approximately the frequency of the tunable oscillator to be controlled, namely an upper reference frequency, and the other of which is a lower reference frequency or incremental frequency. For the sake of illustration, it is assumed that the oscillator to be controlled has a frequency of 1 megacycle, and that the incremental frequency is to be 10 kilocycles, In this case the frequency divider 18 may consist of two steps 22 and 23 having division ratios of 2 and 5 respectively, and the frequency multiplier 19 may also consist of two steps 24 and 25 having frequency multiplication factors of 2 and 5 respectively. The invention is not limited to the use of frequency changing devices of any particular type. However, it has been found satisfactory in the case of the frequency divider 18 to employ blocking oscillators for the two steps 22 and 23, and in the case of the frequency multiplier 19 to employ vacuum tube amplifiers with tank circuits tuned to the desired harmonic.

The frequency standard unit 11 is provided with two output channels 26 and 27 supplied through the frequency divider 18 and the frequency multiplier 19, respectively, from the reference crystal 17.

The oscillator and control unit 12 comprises a local or tunable oscillator 28, a high frequency mixer and beat producing device 29, which in the specific case illustrated takes the form of an inductive mixer, a pulser 31, a beat frequency mixer 32, which in the specific case illustrated takes the form of a resistance mixer, a discriminator 33, a frequency adjusting element in the form of a reactance tube 34 connected in controlling relation to the local oscillator 28, and a suitable output terminal 30 connected to the oscillator 28. The oscillator and control unit 12 is provided with two input connections represented by the output channels 26 and 27 of the frequency standard 11 connected respectively to the pulser 31 and the high frequency mixer or beater 29.

If frequency multiplication is desired, the frequency multiplier 14 may be connected to the output terminal 30 of the oscillator and control unit 12.

The cathode ray tube monitor 13 comprises a cathode ray indicating tube 35, having conventional deflection and control circuits with a 10 kilocycle amplifier 36 for supplying deflection voltage of adequate magnitude from the 10 kilocycle output line 26 of the frequency standard 11, a pair of phase shifters 37 and 38 for converting the output of the 10 kilocycle amplifier 36 into a pair of quadrature voltages, and a beat-frequency amplifier 39 for supplying the output of the high frequency mixer or beater 29 to the control circuit of the cathode ray tube 35.

The cathode ray tube 35 includes an "electron gun" having a control grid 35a in addition to other conventional elements of such apparatus and the deflection circuits. The latter are represented by pairs of electrostatic deflection plates 35b and 35c respectively. The plates 35b are connected to the phase shifter 37, the plates 35c are connected to the phase shifter 38, and the control grid 35a is connected to the beat frequency amplifier 39. It is to be understood that the connections are represented only schematically, not being complete electric circuit connections, and that certain conventional elements have been omitted.

The apparatus represented by the rectangle 12 and shown in more detail in Fig. 2, comprises the oscillator 28, a cathode-follower tube 40 interposed between the oscillator 28 and the output terminal 30 for isolating the oscillator 28 from the output terminal and also isolating it from the high frequency mixer 29, a buffer tube 41 for isolating the one-megacycle channel 27 of the frequency standard 11 from the high frequency mixer 29, a beat frequency detector 42 connected to the output of the mixer 29, the pulser 31, a buffer 43 interposed between the 10 kilocycle channel 26 and the pulser 31, a phase splitter 44 for supplying voltage of opposed phase relationships to the discriminator 33 from the beat frequency detector 42, preferably a pair of amplifiers 45 and 46 interposed between the phase splitter 44 and the discriminator 33, and the reactance tube 34 connected across the tank circuit of the oscillator 28. The beat frequency mixer 32 is so arranged as to mix the output of the beat frequency detector 42 differentially with the output of the pulser 31.

For convenience of description and explanation specific illustrative numerical values of frequency have been mentioned. It will be understood, however, that the invention is not limited to these values or to the ratios between them.

It will be understood likewise that the invention is not limited to the use of a particular type or form of oscillator or alternating-current generator. For the sake of illustration the tunable oscillator 28 has been represented as a vacuum tube circuit of the series-connected grounded-grid Colpitt's type. The oscillator as illustrated comprises a triode vacuum tube 47 having the conventional anode 48, cathode 49 and control electrode or grid 51.

The circuit as shown in the particular arrangement illustrated utilizes a grid grounded with respect to radio frequency, and accordingly a grid resistor 52 is provided which is by-passed by a condenser 53. A radio frequency choke 54 is connected in series with the cathode 49 and a ground connection, and a suitable source of anode or plate voltage, represented by a B battery 55, is provided having a positive terminal 56 connected to the anode 48 and having a grounded negative terminal. Other power supply connections are, for convenience, indicated by positive terminals with the same reference numeral 56.

The vacuum tube 47 is provided with a tunable tank circuit consisting of an inductance 57 shunted by an adjustable condenser 58 serving to permit adjustment of the frequency of the oscillator 28. The inductance 57 is connected in series with the plate lead. A conventional decoupling network comprising a series resistor 59 and a condenser 61 may be utilized.

For correcting the actual frequency of the output of the oscillator 28, the reactance tube 34 is connected across the tank circuit consisting of the inductance 57 and the condenser 58. In order to enable the reactance tube 34 to exert a greater degree of control on the frequency of the oscillator 28, the oscillator tube 47 is preferably operated at a lower plate voltage than the reactance tube 34. Accordingly, a dropping resistor 62 is also connected in series between the anode 48 and the positive terminal 56 of the power supply, and the resistor 62 is by-passed for radio frequency by a condenser 63.

It will be understood that as in the usual Colpitt's circuit, feed-back coupling condensers 64 and 65, connected in series across the tank circuit are utilized with their junction terminal connected to the cathode 49.

The reactance tube 34 may take the form of a pentode or other appropriate vacuum tubes having conventional electrodes including an anode 67, a cathode 68 and a control electrode or grid 69. The cathode 68 is shown as connected in series with a by-passed resistor 71 for providing normal cathode bias. The anode 67 is connected to the high potential terminal 70 of the tank circuit 57—58 of the oscillator 28. For producing the reactance effect, the control grid 69 is coupled to the tank circuit 57—58 through a phase shifting circuit consisting of a condenser 72 and a resistor 73 in series.

As will be explained in greater detail hereinafter, a connection is made from the discriminator 33 through a conductor 74 to the grid 69 for varying the bias of the tube 34 and thereby varying the reactance effect and the tuning of the oscillator 28 in response to variations in the direct current output of the discriminator 33. Preferably a smoothing circuit comprising a series resistor 75, and a filter condenser 76 is connected between the conductor 74 and the terminal 77 of the resistor 73 forming a part of the phase shifting network.

The high frequency mixer 29 is illustrated as taking the form of a transformer 78 having a primary winding 79 coupled to the one megacycle channel 27 through the buffer stage 41, and having a secondary winding 81 conductively connected to the output terminal 30 of the oscillator 28. The cathode follower 40 serves to couple the tank circuit 57—58 to the output terminal 30.

Preferably, an adjustable tuning condenser 82 is connected across the secondary winding 81 of the transformer 78 to enable the winding 81 to be tuned broadly to the frequency of the oscillator 28 and the reference signal supplied from the channel 27. To avoid excessive sharpness of tuning, a resistor 83 may also be connected across the winding 81.

The beat frequency detector 42 may take the form of a diode or a diode-connected triode, as shown, with a load circuit comprising a resistor 84 in series with a choke inductance 85, to improve the response at higher beat frequencies.

The beat frequency mixer 32 is represented as being of the differential type having two outputs, one combining the inputs in opposite relation from the other output. As illustrated, the beat frequency mixer 32 comprises a pair of resistors 86 and 87 coupled respectively to one of the outputs of the phase splitter 44, and the output of the pulser 31, and a second pair of resistors 88 and 89 coupled respectively to the second output of the phase splitter 44 and the output of the pulser 31.

In order to provide balance adjustment, a resistor 91 with a grounded adjustable tap 92 may be connected between the junction terminal 93 of the resistors 86 and 87 and the junction terminal 94 of the resistors 88 and 89. It will be understood that the phase splitter 44 in the form illustrated comprises a vacuum tube 95 with anode and cathode load resistors 96 and 97, with an input coupling from the beat frequency detector 42, and with anode and cathode output couplings respectively to the resistor 86 and the resistor 88.

The junction terminals 93 and 94 of the mixer 32 serve as output terminals and may be coupled directly to the phase discriminator 33, but preferably amplifiers 45 and 46 are interposed in the coupling.

The phase discriminator 33 comprises a pair of diodes or other unilaterally conducting elements 98 and 99 with load resistors. A bridge arrangement may be employed comprising resistors 101 and 102 connected in series between diode anodes and having a junction terminal 103, and resistors 104 and 105 in series between diode cathodes with a junction terminal 106 connected to the terminal 103. A smoothing condenser 107 is preferably connected across the resistors 104 and 105.

The invention is not limited to utilizing a particular form of pulser for converting the incremental frequency input, in this case a 10 kilocycle signal from channel 26, into short duration pulses. For the sake of illustration, however, the pulser 31 has been shown as taking the form of a single pulse or triggered multivibrator circuit. As illustrated, the pulser 31 comprises a pair of discharge tubes such as triode vacuum tubes 108 and 109 having a common cathode resistor 111 for normally biasing the tube 108 to cut-off. The tube 108 is provided with a grid biased to ground while the tube 109 is provided with a grid biased to cathode potential, whereby the tube 109 is normally in a current conducting condition. A conventional capacity-resistance coupling represented by a condenser 112 and a resistor 113 is provided from the tube 108 to the tube 109. The common cathode resistor 111 serves as a coupling from the tube 109 back to the tube 108.

For providing an output of adjustable amplitude from the pulser 31, an adjustable tap 114 is provided on the cathode resistor 111, and is connected by means of a conductor 115 to the resistors 87 and 89 of the beat frequency mixer 32. As previously explained, the buffer tube 43 is preferably interposed between the 10 kilocycle input channel 26 and the pulser 31, being coupled to the input of the tube 108 of the multi-vibrator pulser 31.

Since the oscillator 28 and the reactance tube 34 are conventional elements, it will be unnecessary to describe the manner of operation thereof in detail. Nevertheless, it may be pointed out that the reactance tube 34 is coupled to the tank circuits 57—58 in such a manner that it draws a quadrature current, the amplitude of which depends upon the potential to which the grid 69 is biased by the output of the discriminator 33. The quadrature current drawn by the reactance tube 34 acts as the equivalent of a variation in the reactance of the elements 57—58 of the oscillator tank circuit. Accordingly, the direct current output of the discriminator 33 determines the frequency of the oscillator 28.

The constants are preferably so chosen that adjustment of the condenser 58 or another suitable tank element provides a rough adjustment in the frequency of the oscillator 28 and changes its frequency from one step to another, whereas the control of the reactance tube 34 provides a fine adjustment. In the case of the particular numerical values assumed for the sake of illustration, the frequency of the oscillator 28 may be varied in 10 kilocycle steps above or below a mid-frequency of a thousand kilocycles. To change the frequency from one step to another, the condenser 58 is adjusted. When the frequency deviates from one of the predetermined steps such as 1000 kilocycles, plus or minus 10 kilocycles, 20 kilocycles, etc., the apparatus automatically varies the adjustment of the reactance tube 34 to restore oscillator frequency to the exact value of one of the 10-kilocycle steps.

In case the frequency of the oscillator 28 differs from the upper reference frequency provided by the frequency standard 11 through the channel 27, a beat frequency may be detected by the detector 42. The wave form of the frequency standard output channel 27 is represented schematically in Fig. 2 by the series of sine waves 116. If the oscillator 28 is adjusted to generate approximately 1010 kilocycles, for example, a beat frequency signal of 10 kilocycles will be produced in the detector 42, which is represented schematically by the sine waves 117. It may be observed that the tuning of the mixer winding 81 to approximately 1 megacycle by the condenser 82 serves to filter out harmonics and parasitics and to eliminate from the detector output any beat frequencies except the one represented by the difference between the reference frequency 116 and the fundamental wave of the output of the oscillator 28.

In the particular instance assumed, the beat frequency 117 has the same frequency value as the incremental reference frequency, in this case a 10 kilocycle wave supplied through the channel 26 by the frequency standard 11 and represented in Fig. 2 by the wave 118.

The constants of the pulser 31 are so chosen that the on-to-off ratio of the tubes 108 and 109 is very high, and pulses of short duration represented by the wave form 119 are produced at the output line 115 of the same frequency as the incremental or lower reference frequency wave 118.

As will become apparent as the description proceeds, the number of different steps of frequency, which may be controlled by the apparatus, is determined by narrowness or shortness of duration of the pulses 119 produced by the multi-vibrator 31. Although the exact limit of relationship between frequency range and the narrowness of the pulse 119 has not been definitely ascertained, it has been found that where the frequency range is to be 200 kilocycles, for example, above or below the mid-frequency, satisfactory operation is obtained with pulses having the duration of 5 microseconds. That is to say, the pulse duration corresponds to the period of a cycle of the maximum beat frequency which is to be encountered. When the oscillator 28 is tuned by means of the condenser 58 to the frequency of 1200 kilocycles, the beat frequency with the reference wave 116 at 1 megacycle is 200 kilocycles.

The phase detector action of the discriminator 33 is explained graphically by the curves of Figs. 3 to 6. The action of the discriminator 33 is responding to phase relationship between the pulse wave 119 and the beat frequency wave 117 is explained for the particular case where the beat frequency equals the pulse frequency by the graphs of Figs. 3 and 4. Preferably, the constants of the apparatus are so chosen that the voltage swing of the rectangular wave 119 is as great as the peak value of the beat frequency wave 117.

Referring to Fig. 3, it is to be observed that when the rectangular wave 119 and the beat frequency wave 117 are superimposed, a wave 121 is produced having a peak value greater than that of either wave, and the magnitude of which depends upon the phase relationship between the waves 117 and 119. For example, the peak value of the wave 121 is represented by the distance 122. The mixer 32 combines the waves 117 and 119 additively in the discriminator diode 99, and combines them differentially, with the beat frequency wave reversed, in the discriminator diode 98. The voltage applied to the discriminator diode 99 is represented by the wave 121 of Fig. 3. On the other hand, the voltage applied to the discriminator diode 98 is represented by a voltage 123, which is a resultant of a rectangular pulse 119 and a reversed sine wave 117'. Consequently, the peak value of the wave 123 is lower as represented by the distance 124. The rectifiers 99 and 98 cause current to flow through the resistors 105 and 104 respectively, which are proportional to the peak values 122 and 124 of waves 121 and 123 respectively. Accordingly, a voltage difference appears across the ends of the resistors 104 and 105 corresponding to the difference 125 between the peak values of the waves 121 and 123. Such a voltage is stored on the condenser 107 and serves to adjust the bias of the reactance tube 34 in order to adjust the natural frequency of the tank circuits 57—58 of the oscillator 28. The variation in quadrature current drawn in parallel with the tank circuits 57—58 serves to adjust the effective phase of the output of the oscillator 28 so that the beat frequency wave 117 is either advanced or retarded until the difference between peak values of the waves 121 and 123 falls to zero, as illustrated by the condition of Fig. 4 wherein the peak of the rectangular wave 119 occurs at the zero of the beat frequency wave 117.

The variation in output of the discriminator 33 with variation in phase between the rectangular wave 119 and its corresponding wave 117 is represented by the curve in Fig. 5 in which the direct current output of the discriminator 33 is measured vertically, and phase angle leading or lagging is measured in a horizontal direction.

The frequency of the oscillator 28 may differ by more than once the incremental reference frequency from the upper reference frequency 116. For example, if the oscillator frequency should be 1020 kilocycles, or 1030 kilocycles and so on, a similar phase responsive action of the discriminator 33 takes place, except that then the rectangular wave 119 does not ride on each cycle of the beat frequency wave but rides on only certain cycles of the beat frequency wave. For example as illustrated in Fig. 6, if the oscillator frequency is 1020 kilocycles or 980 kilocycles so that the beat frequency is 20 kilocycles, the beat frequency will be represented by a wave 117A, having twice the periodicity represented in Figs. 3 and 4; whereas the rectangular wave 119 will have the same frequency as before. Nevertheless, if there is a difference in phase between the beat frequency wave 117A and a multiple of the rectangular wave frequency 119, corresponding to the frequency of the wave 117A, there will be a difference in the peak values of resultant waves 121' and 123', and the difference of peak value represented by the distance 125' will produce a current giving rise to a unidirectional voltage output applied through the conductor 74 to the grid circuit of the reactance tube 34. Accordingly, the phase of the oscillator 28 is adjusted automatically to correspond exactly to the phase of the reference wave 116, although not at the same frequency.

When the local oscillator 28 is operating at substantially the frequency of the upper reference wave 116 supplied by the channel 27, variations from exact phase coincidence between the output of the oscillator 28 and the reference wave 116 will be indicated by the output of the discriminator 33, and the polarity of the discriminator 33 will depend upon the sign of the phase angle, i. e., whether the phase variation is lagging or leading as represented by Fig. 5. Similarly when the oscillator 28 is operating at different set frequencies above or below the frequency of the upper reference 116, the polarity of the output of the discriminator 33 will depend upon whether the apparatus is operating above or below a frequency deviating a fixed number of steps from the reference frequency. The discriminator 33 acting through the reactance tube 34 will therefore correct the frequency for any frequency setting of the condenser 58.

The operator of the apparatus may ascertain from the cathode-ray-tube monitor 13 of Fig. 1 whether the oscillator 28 has locked in at the reference frequency 116 or at some other step frequency; and may determine the step in which the oscillator has locked in by observing the screen of the cathode-ray oscilloscope 35, referring to Figs. 1 and 7. It is to be observed that the oscilloscope 35 has a sweep circuit energized at the frequency of the incremental reference wave, in this case a 10 kilocycle frequency, causing the cathode ray beam to rotate at this frequency. The grid 35a of the cathode ray tube, however, is energized at a frequency equalling the beat frequency or difference in frequencies between the upper reference wave 116 supplied over the channel 27 and the frequency of the oscillator 28. Accordingly, the potential of the grid 35a will be raised one or more times during each rotation of the cathode ray beam, the number of times equalling the ratio of the beat frequency to the incremental reference wave frequency, which latter is the sweep frequency of the beam. For example, with apparatus having the numerical values assumed for the sake of illustration, when the oscillator 28 is operating at a frequency of 1040 kilocycles or 960 kilocycles, the beat frequency will be 40 kilocycles or four times the frequency at which the cathode ray beam is rotated. For this condition, as illustrated in Fig. 7, four spots 126 will be produced in a screen of the cathode ray tube 35. The spots 126 will be light spots or dark spots depending on whether the grid 35a is so biased as to cut-off the cathode ray tube except during the peak values of the output of the beat frequency amplifier 39 or to cut off the tube only during the minimum values of the beat frequency amplifier 39. The actual length of the spots will, of course, depend upon the magnitude of the bias of the grid 35a of the cathode ray tube 35. It will be understood, of course, that if desired the beat frequency amplifier 39 may be provided with a peak wave output so as to sharpen the spots.

Whether the oscillator 28 is operating at a frequency above or below that of the reference wave 116, may readily be determined by manipulation of the frequency adjusting condenser 58. For example, if the condenser 58 is turned toward the position increasing the capacity thereof so as to decrease the frequency of the oscillator 28, but observation indicates that the number of spots 126 of the screen of the cathode ray tube 35 is increasing, it is apparent that the oscillator 28 is operating at a frequency below the mid-band frequency corresponding to the frequency of the upper reference wave 116.

The number of spots 126 seen on the screen of the cathode ray tube represents the frequency deviation of the oscillator 28 from the reference wave 116 expressed as a multiple of the incremental reference frequency 118. The term "multiple" is used in the specification and claims to include zero for the case when the oscillator operates at the reference frequency and no spots appear on the cathode ray screen.

In describing the apparatus such as illustrated in Fig. 1, it has been assumed that the frequency desired at the oscillator 28 is such that the two reference frequencies from the channels 27 and 26 may bear an integral relation to each other and that the relationship is such that the division or multiplication may readily be carried out by electrical means. However, the invention is not limited to the specific arrangement of Fig. 1 in which a single crystal reference 17 may provide two reference frequencies by two different frequency changes or by a single frequency change and a direct output from the crystal reference to one of the output channels. For example, if the desired output frequency or the desired frequency steps in the variation of the oscillator frequency should be such as not to adapt themselves to electrical change of a single reference frequency to two different reference frequencies, two separate crystal references or other standards may be utilized.

As illustrated in Fig. 8, a crystal oscillator or a source of arbitrary standard of frequency represented by a rectangle 128 is utilized to provide the upper reference frequency. A second lower reference frequency source represented by rectangle 129 may be utilized to provide the incremental reference frequency. The outputs from the two reference frequency sources 128 and 129 may be supplied through the output channels 26 and 27 for the operation of the control unit 12 as described in connection with the apparatus of Fig. 1 and Fig. 2.

It is to be understood that the frequency standard 11 is checked against an absolute standard such as the output of the Bureau of Standard's radio station WWV by comparing the output of the WWV amplifier 16 with the frequency of the crystal reference 17 or one of its harmonics by means of a beat frequency amplifier 21 supplying a beat frequency indicator such as a pair of headphones 16.

The basic manner in which the controlled-frequency apparatus of Fig. 1 operates is as follows: A crystal oscillator is made to supply two accurate reference frequencies by multiplication and/or division; the local oscillator to be synchronized is compared to the higher reference to obtain a beat at the difference frequency and this beat is maintained at an accurate value by suitable control circuits actuated by a device which compares the beat to the lower reference. The system is in equilibrium when: (1) the frequency of the beat is a multiple of the lower reference or incremental reference, and (2) the phase of the beat signal is in strict relationship to the phase of the lower reference. The phase requirement assures the desired accuracy of lock-in.

One may consider an accurate source, such as a crystal, at frequency $F_1$, and a local oscillator to be maintained at a frequency $F_2$. The lower frequency reference is obtained by division of the crystal frequency by a factor N. The local oscillator can then be locked in at frequencies defined by $$F_2 = F_1 + m\frac{F_1}{N}$$

where $$m = \pm 1, \pm 2, \ldots$$

For a system in which the final output is considerably higher in frequency than $F_1$ the frequency $F_2$ may be multiplied by a factor, such as M. Then $$MF_2 = MF_1\left(1 + \frac{m}{N}\right)$$

With the output band center denoted by $F_0$ and the steps in output frequency by $\Delta F_0$, we have $$F_0 = MF_1$$

$$\Delta F_0 = MF_1 \frac{1}{N}$$

then $$N = \frac{F_0}{\Delta F_0}$$

$$M = \frac{F_0}{F_1}$$

With $F_0$ and $\Delta F_0$ prescribed, N may be determined with the physical restriction that it must be obtainable by frequency multiplication and/or division in electrical circuits. Likewise, M is determined with a number of integral values possible through the choice of $F_1$. There is no requirement that $F_1$ itself be the fundamental crystal frequency; it may be derived electrically as an accurate multiple or sub-multiple of the crystal.

It may be that desired values of $F_0$ and $\Delta F_0$ do not define a value of N which is obtainable electrically. In this case two crystals as in the arrangement of Fig. 8 may be employed, one to determine $F_1$ and the second to determine the increment defined previously by the ratio $$\frac{F_1}{N}$$

This incremental frequency may be denoted by $F_3$. Then, for the two crystal case in Fig. 8

$$F_0 = MF_1$$

as before $$\Delta F_0 = MF_3$$

Certain embodiments of the invention and certain methods of operation embraced therein have been shown and particularly described for the purpose of explaining the principle of operation of the invention, and showing its application, but it is to be understood that the invention contemplates such modifications as are within the scope of the appended claims.

What I claim as new and desire to secure by Letters Patent of the United States is:

1. An oscillator and control unit responsive to an upper reference frequency and an incremental frequency comprising an adjustable frequency oscillator, a high frequency mixer jointly energized by the upper reference frequency and the oscillator for producing a beat frequency, a pulser responsive to the incremental reference frequency for producing short duration pulses of the same frequency as the incremental frequency, a beat frequency mixer for comparing said beat frequency and said pulse output, a discriminator responsive to the beat frequency mixer for producing unidirectional output responsive to the phase relationship between the beat frequency signal and the pulse signal, a reactance tube connected in controlling relationship to said oscillator, and a control connection to said reactance tube energized by the output of said discriminator.

2. In combination with a variable phase input source, a reference voltage source, a beat-frequency detector, means for supplying voltages from said sources to said detector, an incremental reference frequency source, means for converting the incremental reference frequency into a rectangular reference wave, means for combining the rectangular wave and the beat frequency output of the beat frequency detector, and a discriminator responsive to said combined output for producing a unidirectional voltage responsive to the phase relationship between the rectangular wave and the beat-frequency output.

3. A synchronizer having input connections from the output of a generator, from an upper reference frequency source and from an incremental frequency source, said synchronizer comprising means for producing a pulse wave synchronized with the incremental reference frequency source, a beat frequency detector jointly responsive to the generator output and the upper reference frequency for producing a beat frequency, means for additively combining the beat frequency and the pulse wave, means for differentially combining the beat frequency and pulse wave, differentially connected unilateral elements respectively responsive to the additive and differential combination of said beat frequency and pulse wave, whereby the resultant output of said unilateral elements is representative of the phase relationship between the generator output and the upper reference frequency.

4. The method of comparing the phase relationship between an oscillator adjustable in phase and frequency with a reference wave and an incremental frequency wave, which method comprises the steps of beating the oscillator output with the reference frequency wave, to produce a beat-frequency wave, converting the incremental frequency wave into a pulse wave having pulses of short duration, additively combining the beat frequency wave and the pulse wave, differentially combining the beat frequency wave and the pulse wave, rectifying such combinations, and opposing the rectified outputs, whereby a resultant output is produced depending in magnitude and polarity upon the phase relationship between the oscillator output and the reference wave output.

5. The method of synchronizing an oscillator with a desired frequency deviating by a fixed difference frequency from a standard frequency source, which method comprises subdividing the frequency of the standard frequency source in such a ratio as to produce a subdivided standard frequency to which the difference frequency bears an integral ratio, producing a pulse wave having short duration pulses synchronized with the subdivided frequency, beating the oscillator output with the standard frequency to produce a beat frequency, and comparing the phase relationship between the beat frequency and the pulse wave.

6. The method of synchronizing an oscillator, of the type having a tank circuit, with a desired frequency deviating by a fixed difference frequency from a standard frequency source, which method comprises subdividing the frequency of the standard frequency source in such a ratio as to produce a subdivided standard frequency to which the difference frequency bears an integral ratio, producing a pulse wave having short duration pulses synchronous with the subdivided frequency, beating the oscillator output with the standard frequency to produce a beat frequency, comparing the phase relationship between the beat frequency and the pulse wave, applying a quadrature current to the tank circuit and varying the magnitude of the quadrature current according with variations in the phase between the pulse wave and the beat frequency wave.

7. In combination a reference frequency source having a pair of output channels, a frequency changer interposed in one of said channels, a tunable oscillator, a frequency mixer jointly responsive to one of said output channels and said oscillator to produce a beat frequency, a pulser synchronized with the other of said channels and a discriminator jointly responsive to said pulser and said beat frequency to produce a control voltage for adjusting the frequency of said oscillator.

8. In an oscillation frequency controlling device: a source of predetermined frequency signal; a pulse forming device coupled to said source for producing pulses at times when signals from said source are in a particular phase; a second source of signals of predetermined frequency, the frequency of said second source being higher than that of the first said source; an oscillation generator, the frequency of which is to be controlled; means for mixing signals from said generator and from said second source to obtain heterodyne signals; and frequency controlling means responsive to a change in relative phase between the signals from said pulse former and the signals from said mixing means; said frequency controlling means being operatively connected with said oscillation generator to control the frequency of the oscillations generated therein in response to a change in said relative phase.

9. In an oscillation frequency controlling device: a source of predetermined frequency signal; a pulse forming device coupled to said source for producing pulses at times when signals from said source are in a particular phase; a second source of signals of predetermined frequency, the frequency of said second source being higher than that of the first said source; an oscillation generator, the frequency of which is to be controlled; means for mixing signals from said generator and from said second source to obtain heterodyne signals; phase detection means, responsive to a change in relative phase between the signals from said pulse former and the signals from said mixing means, to provide a unidirection signal corresponding to such changes of phase; and frequency controlling means responsive to said unidirectional signals; said frequency controlling means being operatively connected with said oscillation generator to control the frequency of the oscillations generated therein in response to a change in said relative phase.

ROBERT C. MOORE.

REFERENCES CITED

The following references are of record in the file of this patent:

UNITED STATES PATENTS

| Number | Name | Date |
| --- | --- | --- |
| 1,985,046 | Morrison et al. | Dec. 18, 1934 |
| 2,178,074 | Jakel et al. | Oct. 31, 1939 |
| 2,201,978 | Bedford | May 28, 1940 |
| 2,209,507 | Campbell | July 30, 1940 |
| 2,234,830 | Norton | Mar. 11, 1941 |
| 2,250,284 | Wendt | July 22, 1941 |
| 2,288,025 | Pomeroy | June 30, 1942 |
| 2,312,079 | Crosby | Feb. 23, 1943 |
| 2,354,800 | Deal | Aug. 1, 1944 |
| 2,358,454 | Goldstine | Sept. 19, 1944 |
| 2,369,663 | Dennis et al. | Feb. 20, 1945 |
| 2,406,125 | Zeigler et al. | Aug. 20, 1946 |

OTHER REFERENCES

Publication No. ST-28, "Cathode Ray Tubes and Their Applications" by Stinchfield, RCA Radiotron Co., Inc., Harrison, N. J., December 1934.